US010210055B2

(12) United States Patent
Zhu

(10) Patent No.: US 10,210,055 B2
(45) Date of Patent: Feb. 19, 2019

(54) METHOD AND SYSTEM FOR DATA STORAGE UPON DATABASE FAILURE

(71) Applicant: Alibaba Group Holding Limited, Grand Cayman (KY)

(72) Inventor: Chunmao Zhu, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 187 days.

(21) Appl. No.: 14/821,385

(22) Filed: Aug. 7, 2015

(65) Prior Publication Data

US 2016/0041886 A1    Feb. 11, 2016

(30) Foreign Application Priority Data

Aug. 8, 2014   (CN) .......................... 2014 1 0389882

(51) Int. Cl.
*G06F 11/14* (2006.01)
*G06F 17/30* (2006.01)

(52) U.S. Cl.
CPC ...... *G06F 11/1474* (2013.01); *G06F 11/1446* (2013.01); *G06F 11/1469* (2013.01);
(Continued)

(58) Field of Classification Search
CPC ............ G06F 11/1415; G06F 11/1446; G06F 11/1448; G06F 11/1456; G06F 11/1458;
(Continued)

(56) References Cited

U.S. PATENT DOCUMENTS 5,799,323 A     8/1998 Mosher, Jr. et al.
5,907,848 A *   5/1999 Zaiken ................... G06Q 40/02
(Continued)

FOREIGN PATENT DOCUMENTS

WO    WO1998040827    9/1998
WO    WO2012166689   12/2012

OTHER PUBLICATIONS

PCT Search Report and Written Opinion dated Nov. 6, 2015 for PCT Application PCT/US15/44319, 10 pages.
(Continued)

*Primary Examiner* — Joseph O Schell
(74) *Attorney, Agent, or Firm* — Lee & Hayes, P.C.

(57) ABSTRACT

Data values stored in a primary database are synchronized to a reading database in M seconds. In the event of a failure of the primary database, a transaction processing server determines a transaction request in M seconds and performing a transaction processing of the transaction request to acquire a corresponding transaction identification and a data variation value, determines whether a data value corresponding to the transaction identification is stored in a standby database or not; if not, determines an accurate data value corresponding to the transaction identification by using the data value stored in the reading database and the data variation value; and stores the transaction identification and the accurate data value in the standby database to provide a service based on the data value stored in the standby database. The techniques of the present disclosure prevent the transaction from being interrupted and improve user experience.

20 Claims, 3 Drawing Sheets

(52) U.S. Cl.
CPC .. *G06F 17/30371* (2013.01); *G06F 17/30575* (2013.01); *G06F 11/1415* (2013.01); *G06F 11/1448* (2013.01); *G06F 2201/80* (2013.01); *G06F 2201/855* (2013.01); *G06F 2201/87* (2013.01)

(58) Field of Classification Search
CPC ............. G06F 11/1464; G06F 11/1469; G06F 11/1471; G06F 11/1474; G06F 2201/82; G06F 2201/855; G06F 2201/86; G06F 2201/87; G06F 17/30575; G06F 17/30371
See application file for complete search history.

(56) References Cited

U.S. PATENT DOCUMENTS

| | | | |
|---|---|---|---|
| 6,751,636 | B1 | 6/2004 | Mende, Jr. et al. |
| 7,437,609 | B2 | 10/2008 | Anderson, Jr. et al. |
| 7,464,113 | B1 | 12/2008 | Girkar et al. |
| 7,499,954 | B2 | 3/2009 | Cherkauer et al. |
| 7,519,859 | B2 * | 4/2009 | Ozawa ................ G06F 11/2041 714/15 |
| 7,890,461 | B2 * | 2/2011 | Oeda ................... G06F 11/1471 707/612 |
| 8,086,564 | B2 * | 12/2011 | Kundu .............. G06F 17/30415 707/610 |
| 8,667,033 | B1 | 3/2014 | McCline et al. |
| 8,775,381 | B1 | 7/2014 | McCline et al. |
| 2005/0132155 | A1 * | 6/2005 | Kasako ............... G06F 11/2058 711/162 |
| 2005/0235121 | A1 * | 10/2005 | Ito ...................... G06F 11/2074 711/162 |
| 2006/0179347 | A1 * | 8/2006 | Anderson, Jr. ..... G06F 11/2023 714/16 |
| 2008/0228833 | A1 | 9/2008 | Kano |
| 2011/0041006 | A1 * | 2/2011 | Fowler .................... G06F 9/466 714/10 |
| 2015/0006478 | A1 | 1/2015 | Raymond et al. |

OTHER PUBLICATIONS

Eckerson, "Three-Tier Client/Server Architecture Achieving Scalability, Performance, and Efficiency in Client/Server Applications", Open Information Systems, vol. 10, No. 1, 1995, pp. 1-20.
Extended European Search Report dated Jan. 4, 2018 for European Patent Application No. 15829030.4, 9 pages.
Kurtz, et al, "PeopleSoft for the Oracle DBA", retrieved on Dec. 21, 2017 at <<http://www.oracle.com/technetwork/database/availability/maa-peoplesoft-local-standby-128609.pdf>>, Jan. 1, 2012, 35 pages.

* cited by examiner

US 10,210,055 B2

METHOD AND SYSTEM FOR DATA STORAGE UPON DATABASE FAILURE

CROSS REFERENCE TO RELATED PATENT APPLICATION

This application claims foreign priority to Chinese Patent Application No. 201410389882.5 filed on 8 Aug. 2014 entitled "METHOD AND APPARATUS FOR DATA STORAGE UPON DATABASE FAILURE," which is hereby incorporated by reference in its entirety.

TECHNICAL FIELD

The present disclosure relates to Internet technology, and, more particularly, to a method and device for data storage, especially a method and device for data storage in the event of a failure of a database.

BACKGROUND

Upon a receipt of a transaction request from an upstream server, a transaction processing server performs a transaction processing of the transaction request and updates a data value stored in a primary database by using a result of the transaction processing. For example, when the primary database is mainly used for storing account balances and the upstream server is used for processing payment behaviors of users, provided that a payment behavior of a user A is paying $100, the upstream server will transmit a transaction request to the transaction processing server, the transaction request being used for requesting to subtract $100 from an account balance of the user A. Upon the receipt of the transaction request, the transaction processing server uses the transaction request to perform a transaction processing which is to subtract $100 from the balance account of the user A. Further, provided that the corresponding account balance of the user A in the primary database is $1000, the transaction processing server needs to subtract $100 from the account balance $1000 of the user A stored in the primary database and update the account balance of the user A stored in the primary database to $900.

In the existing technologies, in the event of a failure of the primary database, the primary database stops providing service, and the primary database continues to provide service only when the primary database is recovered to guarantee the accuracy of data. However, in the event of the failure of the primary database, the transaction processing server cannot acquire the data value in the primary database and perform a transaction processing based on the data value stored in the primary database, which interrupts the transaction and influences the user experience.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "technique(s) or technical solution(s)" for instance, may refer to apparatus(s), system(s), method(s) and/or computer-readable instructions as permitted by the context above and throughout the present disclosure.

The present disclosure provides a method and device for data storage in the event of a failure of a database to prevent a transaction from being interrupted in the event of a failure of a primary database and improve user experience.

The present disclosure provides an example method for data storage in the event of a failure of a database, wherein the data values stored in a primary database need to be synchronized to a reading database in M seconds. The method may include the following operations: in the event of a failure of the primary database, determining, by a transaction processing server, a transaction request within M seconds and performing a transaction processing of the transaction request to acquire a corresponding transaction identification and a data variation value; determining, by the transaction processing server, whether a data value corresponding to the transaction identification is stored in a standby database or not; if not, determining, by the transaction processing server, an accurate data value corresponding to the transaction identification by using data value stored in a reading database and the data variation value; and storing, by the transaction processing server, the transaction identification and the accurate data value in the standby database to provide a service based on the data value stored in the standby database.

For example, the determining, by the transaction processing server, the transaction request in M seconds may include the following operations: informing, by the transaction processing server, an upstream server to reinitiate the transaction request that is initiated in M seconds so that the upstream server retransmits the transaction request which has already been initiated in M seconds; and receiving, by the transaction processing server, the transaction request from the upstream server and determining that the transaction request is the transaction request which is retransmitted by the upstream server and has already been initiated in M seconds.

Before that the transaction processing server determines whether the data value corresponding to the transaction identification is stored in the standby database, the method may further include the following operations: determining, by the transaction processing server, whether the data value corresponding to the transaction identification is stored in the reading database or not; if the data value corresponding to the transaction identification has already been stored, determining that the accurate data value corresponding to the transaction identification has already been stored in the reading database and discarding the currently acquired transaction identification and data variation value; and if the data value corresponding to the transaction identification is not stored, executing the step of determining whether the data value corresponding to the transaction identification is stored in the standby database or not.

After the transaction processing server determines whether the data value corresponding to the transaction identification is stored in the standby database, the method may further include the following operations: if the data value corresponding to the transaction identification has already been stored in the standby database, determining, by the transaction processing server, that the accurate data value corresponding to the transaction identification has already been stored in the standby database and discarding the currently acquired transaction identification and data variation value.

For example, the determining, by the transaction processing server, the accurate data value corresponding to the transaction identification by using the data value stored in the reading database and the data variation value specifically may include the following operations: when the data value corresponding to the transaction identification is not stored in the reading database, acquiring, by the transaction processing server, the data value requested by the transaction request in the reading database and determining that a sum or combination of the data value requested by the transaction request in the reading database and the data variation value is the accurate data value corresponding to the transaction identification; or when the data value corresponding to the transaction identification has already been stored in the reading database, determining, by the transaction processing server, that the data value corresponding to the transaction identification stored in the reading database is the accurate data value corresponding to the transaction identification.

After the transaction processing server stores the transaction identification and the accurate data value in the standby database, the method may further include the following operations: when the failure of the primary database is recovered, recovering, by the transaction processing server, the data value stored in the standby database to the primary database and providing the service based on the data value stored in the primary database.

The present disclosure also provides an example transaction processing server. Data values stored in a primary database need to be synchronized to a reading database in M seconds. The transaction processing server may include the following modules:

an acquisition module that, in the event of a failure of the primary database, determines a transaction request in M seconds and performing a transaction processing of the transaction request to acquire a corresponding transaction identification and a data variation value;

a judgment module that determines whether a data value corresponding to the transaction identification is stored in a standby database or not;

a determination module that, when a judgment result from the judgment module is negative, determines an accurate data value corresponding to the transaction identification by using a data value stored in a reading database and the data variation value; and a storage module that stores the transaction identification and the accurate data value in the standby database to provide a service based on the data value stored in the standby database.

For example, the acquisition module, when determining the transaction request in M seconds, informs an upstream server to reinitiate the transaction request that is initiated in M seconds so that the upstream server retransmits the transaction request which has already been initiated in M seconds; and receives the transaction request from the upstream server and determines that the transaction request is the transaction request which is retransmitted by the upstream server and has already been initiated in M seconds.

For example, the judgment module further, before determining whether the data value corresponding to the transaction identification is stored in the standby database, determines whether the data value corresponding to the transaction identification is stored in the reading database or not; if the data value corresponding to the transaction identification has already been stored, determines that the accurate data value corresponding to the transaction identification has already been stored in the reading database and discards the currently acquired transaction identification and data variation value; and if the data value corresponding to the transaction identification is not stored, executes the process of determining whether the data value corresponding to the transaction identification is stored in the standby database or not.

For example, the judgment module further, after determining whether the data value corresponding to the transaction identification is stored in the standby database, if the data value corresponding to the transaction identification has already been stored in the standby database, determines that the accurate data value corresponding to the transaction identification has already been stored in the standby database and discards the currently acquired transaction identification and data variation value.

For example, the determination module, when determining the accurate data value corresponding to the transaction identification by using the data value stored in the reading database and the data variation value, if the data value corresponding to the transaction identification is not stored in the reading database, acquires the data value requested by the transaction request in the reading database and determines that a sum or combination of the data value requested by the transaction request in the reading database and the data variation value is the accurate data value corresponding to the transaction identification; or if the data value corresponding to the transaction identification has already been stored in the reading database, determines that the data value corresponding to the transaction identification stored in the reading database is the accurate data value corresponding to the transaction identification.

The storage module is further used for, after the storing the transaction identification and the accurate data value in the standby database, when the failure of the primary database is recovered, recovering the data value stored in the standby database to the primary database and providing the service based on the data value stored in the primary database.

Compared with the existing technologies, the techniques of the present disclosure have at least the following technical advantages: in the event of a failure of the primary database, the transaction processing server determines the accurate data value through the data value stored in the reading database and store the accurate data value in the standby database, and thus when there is a failure of the primary database and the primary database waits for a recovery, the service is provided based on the data value stored in the standby database, so that the transaction processing server acquires the accurate data value from the standby database to perform a transaction processing, thereby preventing the transaction from being interrupted and improving user experience.

BRIEF DESCRIPTION OF THE DRAWINGS

To describe the technical solutions in the example embodiments of the present disclosure more clearly, the following briefly introduces the accompanying drawings for describing the example embodiments of the present disclosure. Apparently, the accompanying drawings merely illustrate some example embodiments of the present disclosure, and a person of ordinary skill in the art may still derive other drawings from these accompanying drawings of the example embodiments of the present disclosure without using creative efforts.

DETAILED DESCRIPTION

The technical solutions in the example embodiments of the present disclosure are described in the following with reference to the accompanying drawings. Apparently, the example embodiments to be described merely represent a part and not all of the embodiments of the present disclosure. All other embodiments acquired by persons of ordinary skill in the art according to the present disclosure without using creative efforts shall belong to the protection scope of the present disclosure.

Figure 1:
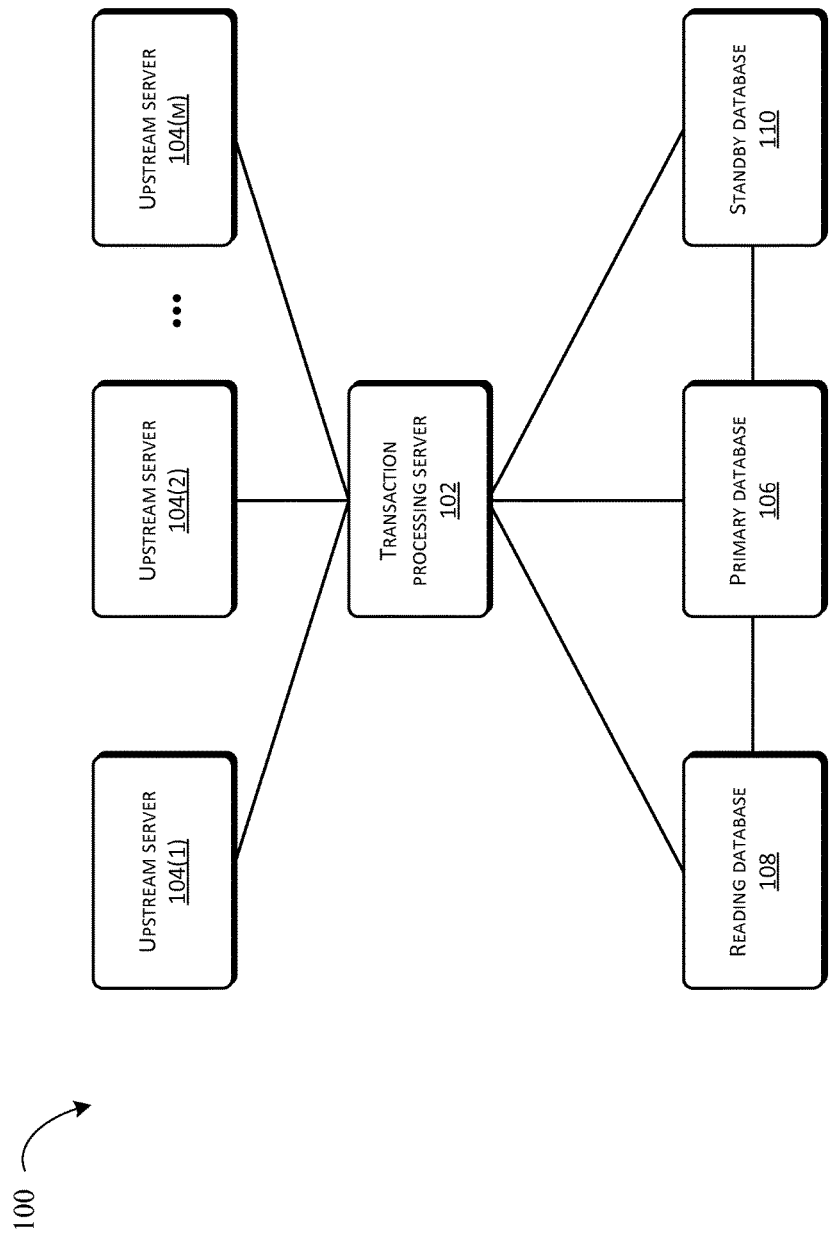
FIG. 1 is a schematic diagram of an example application scenario according to the present disclosure.

A first example embodiment of the present disclosure is described below. To solve the problems in existing technologies, the example embodiment of the present disclosure provides a method for data storage in the event of a failure of a database. Referring to FIG. 1 which is a schematic diagram of an example application scenario according to the example embodiment of the present disclosure, the method is applied to a system 100 including a transaction processing server 102, one or more upstream servers 104(1), 104(2), . . . , 104(m), and at least three databases. A number of the upstream server may be one or more and m may be any integer. The three databases may include a primary database 106, a reading database 108, and a standby database 110, wherein the reading database 108 is a database that has a low synchronization delay with the primary database.

As shown in FIG. 1, the transaction processing server 102 is connected with the primary database 106, the reading database 108, and the standby database 110 respectively. The primary database 106 is connected to the reading database 108 and the standby database 110.

When there is no failure of the primary database 106, reading and writing service is provided by the primary database 106, i.e., the transaction processing server 102 either writes data into the primary database 106 or reads data from the primary database 106. In the event of a failure of the primary database 106, reading and writing service will be provided by the standby database 110, i.e., the transaction processing server 102 either writes data into the standby database 110 or reads data from the standby database 110.

For example, the reading database 108 is used as a backup database of the primary database 106. When there is no failure of the primary database 106, the data in the primary database 106 is synchronized to the reading database 108 and the reading database 108 may only provide the reading service, i.e., the transaction processing server 102 may read data from the reading database 108 but cannot write data into the reading database 108. For example, the reading database 108 is a database which provides backup function for the primary database 106 and only provides the reading service.

In the example embodiment of the present disclosure, when there is no failure of the primary database 106, the service is provided by using the data value stored in the primary database 106, and all data values stored in the primary database 106 are synchronized to the reading database 108. When the data values stored in the primary database 106 are synchronized to the reading database 108, the data values stored in the primary database need to be synchronized to the reading database in M seconds. That is, after a new data value is stored in the primary database 106 or the data value stored in the primary database 106 changes, the primary database 106 will synchronize the stored new data value or the changed data value to the reading database 108 in M seconds. Thus a period of inconsistency between the data values in the primary database 106 and the reading database 108 is at most M seconds, and the data values in the primary database 106 will be consistent with the data values in the reading database 108 eventually.

For example, a value of M seconds is usually 1 second. Certainly, under different application scenarios, the value of the M seconds is depending on various factors that may include a performance of the primary database, which will not be detailed herein.

In an example embodiment of the present disclosure, in the event of a failure of the primary database 106, before the failure of the primary database 106 is recovered, the data values are stored by using the standby database 110 and the service is provided by using the data values stored in the standby database 110.

Figure 2:
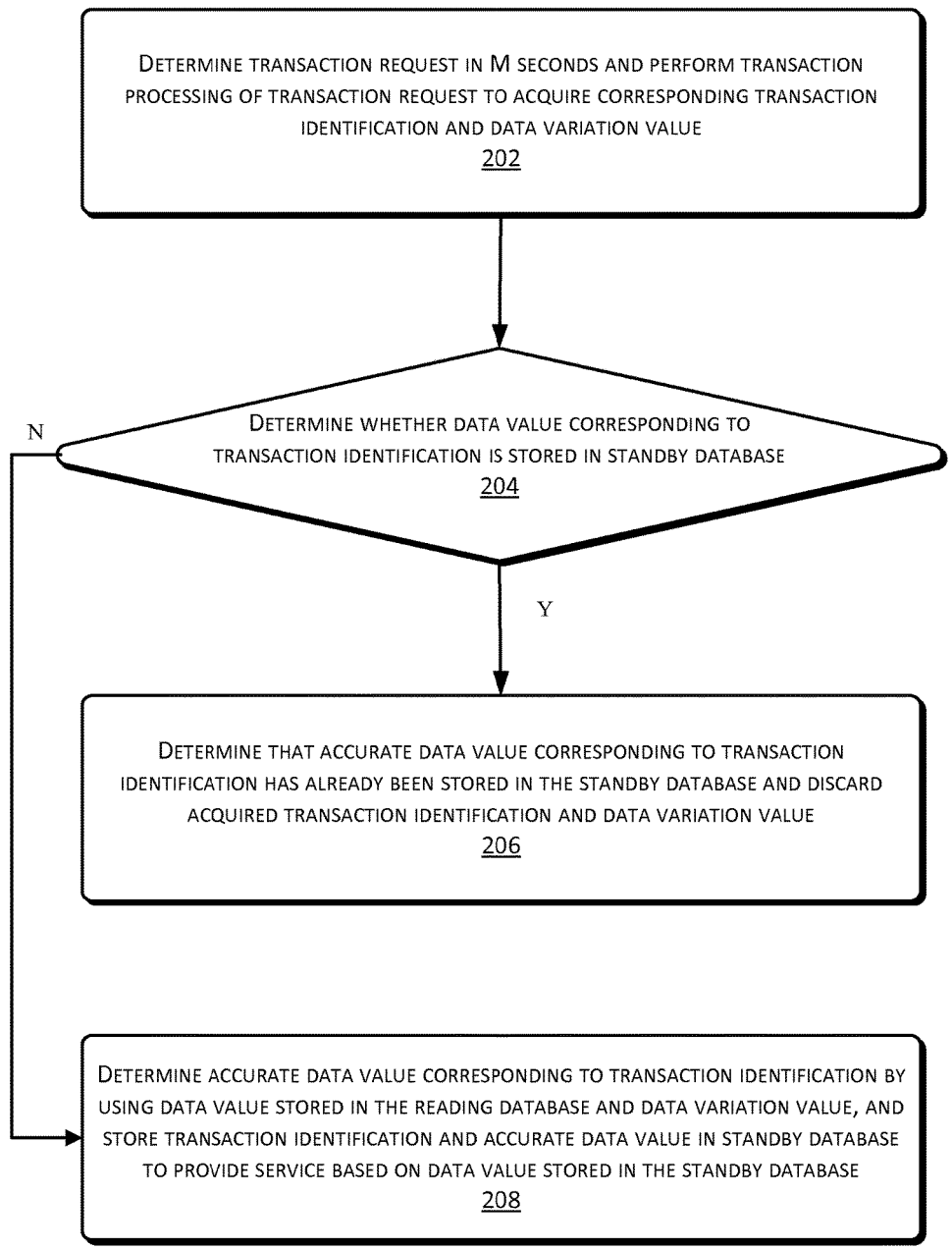
FIG. 2 is a flowchart of an example method for data storage in the event of a failure of a database according to a first embodiment of the present disclosure.

Under the above-mentioned application scenario, as shown in FIG. 2, in the event of a failure of the primary database, an example method for data storage in the event of a failure of a database according to the example embodiment of the present disclosure may include the following operations.

At 202, a transaction processing server determines a transaction request within M seconds (such as M seconds before the failure of the primary database) and performs a transaction processing of the transaction request to acquire corresponding transaction identification and a data variation value.

In the example embodiment of the present disclosure, the determining, by the transaction processing server, the transaction request that occurs in M seconds may include, but is not limited to the following operations.

The transaction processing server informs an upstream server to reinitiate the transaction request that is initiated in M seconds so that the upstream server retransmits the transaction request which has already been initiated in M seconds; then the transaction processing server receives the transaction request from the upstream server, and determines that the transaction request is retransmitted by the upstream server and has already been initiated in M seconds.

In the event of a failure of the primary database, the transaction processing server informs all upstream servers which interact with the transaction processing server (i.e., all upstream servers which are connected to the transaction processing server) to reinitiate the transaction request that is initiated in M seconds. Upon the receipt of the notification, the upstream server queries which transaction request is transmitted from the upstream server to the transaction processing server in M seconds and retransmits the transaction request which has already been initiated in M seconds to the transaction processing server. For example, provided that an upstream server has transmitted a transaction request 1 to the transaction processing server in M seconds, the upstream server retransmits the transaction request 1 to the transaction processing server. Then, the transaction processing server receives the retransmitted transaction request 1 which is from the upstream server and has already been initiated in M seconds.

In the example embodiment of the present disclosure, each time the transaction processing server performs a transaction processing of the transaction request, the transaction processing server acquires a transaction identification (such as a transaction number) corresponding to the transaction request and a data variation value, wherein the transaction identification corresponding to the transaction request may also be referred to as an idempotent control signal.

For example, when the primary database is mainly used for storing account balance and the upstream server is used for processing the payment behaviors of users, provided that a payment behavior of a user A is paying $100, the upstream server will transmit a transaction request 1 to the transaction processing server, the transaction request 1 being used for subtracting $100 from the account balance of the user A. Upon a receipt of the transaction request 1, the transaction processing server uses the transaction request 1 to perform a transaction processing which is to subtract $100 from the account balance of the user A. It is assumed that the transaction identification corresponding to the transaction processing is 123456. Further supposing that the corresponding account balance of the user A in the primary database is $1000, the transaction processing server subtracts $100 from the account balance $1000 of the user A stored in the primary database, updates the account balance of the user A stored in the primary database to $900, and records the transaction identification such as 123456 corresponding to the transaction processing in the primary database.

In the event of a failure of the primary database, the transaction processing server informs all upstream servers to reinitiate the transaction request that was initiated in M seconds before the failure of the primary database. Upon the receipt of the notification, the upstream server retransmits the transaction request 1 to the transaction processing server, the transaction request 1 being used for subtracting $100 from the account balance of the user A. Upon the receipt of the transaction request 1 retransmitted by the upstream server, the transaction processing server uses the transaction request 1 to perform a transaction processing which is to subtract $100 from the account balance of the user A. In the process of performing the transaction processing by using the transaction request, the corresponding transaction identification acquired by the transaction processing server is 123456 and the corresponding data variation value acquired by the transaction processing server is to subtract $100.

At 204, the transaction processing server determines whether a data value corresponding to the transaction identification is stored in a standby database or not. If so, operations at 206 are executed; and if not, operations at 208 are executed.

In the example embodiment of the present disclosure, in the event of a failure of the primary database, the standby database will be used for storing the data values, and the service is provided by using the data values stored in the standby database. Therefore, after the transaction processing server performs a transaction processing of the transaction request to acquire the corresponding transaction identification and data variation value, the transaction processing server determines whether the data value corresponding to the transaction identification is stored in the standby database or not. If the data value corresponding to the transaction identification is stored in the standby database, the accurate data value corresponding to the transaction identification has already been stored in the standby database, and operations at 206 will be executed; and if the data value corresponding to the transaction identification is not stored in the standby database, the accurate data value corresponding to the transaction identification is not stored in the standby database, and operations at 208 will be executed. For example, the transaction processing server determines whether the data value corresponding to the transaction identification 123456 is stored in the standby database or not; if so, operations at 206 are executed; and if not, operations at 208 are executed.

In the example embodiment of the present disclosure, before the transaction processing server determines whether the data value corresponding to the transaction identification (such as 123456) is stored in the standby database or not, the transaction processing server may further determine whether the data value corresponding to the transaction identification (such as 123456) is stored in the reading database or not. If the data value corresponding to the transaction identification has already been stored in the reading database, it is determined that the accurate data value corresponding to the transaction identification has already been stored in the reading database. Thus, the transaction processing server may discard the currently acquired transaction identification and data variation value directly, and operations at 204 will not be executed, and the processing of the transaction request is ended. Alternatively, the transaction processing server executes the operation of "determining whether the data value corresponding to the transaction identification is stored in the standby database or not", i.e., executes the above-mentioned 204. If the data value corresponding to the transaction identification is not stored in the reading database, the transaction processing server needs to execute the operation of "determining whether the data value corresponding to the transaction identification is stored in the standby database or not", i.e., executes the above-mentioned 204.

At 206, the transaction processing server determines that an accurate data value corresponding to the transaction identification has already been stored in the standby database and discards the currently acquired transaction identification and data variation value.

In the example embodiment of the present disclosure, when the data value corresponding to the transaction identification has already been stored in the standby database, it indicates that the accurate data value corresponding to the transaction identification has already been stored in the standby database, i.e., the accurate data value and the transaction identification have already been stored in the standby database. Therefore, it is no longer necessary for the transaction processing server to store the transaction identification and the corresponding accurate data value in the standby database and the transaction processing server may directly discard the currently acquired transaction identification and data variation value.

At 208, the transaction processing server determines the accurate data value corresponding to the transaction identification by using the data value stored in the reading database and the data variation value, and stores the transaction identification and the accurate data value in the standby database to provide a service based on the data value stored in the standby database.

In the example embodiment of the present disclosure, since the data values stored in the primary database need to be synchronized to the reading database in M seconds when there is no failure of the primary database, all data values stored prior to M seconds before the failure of the primary database have already been synchronized to the reading database, and these data values do not need to be stored in the standby database any longer. With respect to the data values stored within M seconds before the failure of the primary database, the data values may have already been synchronized to the reading database, or may have not been synchronized to the reading database. Therefore, the data values stored within M seconds before the failure of the primary database need to be stored in the standby database to provide accurate data values through the standby database. In order to store the data values within M seconds before the failure of the primary database in the standby database, the above-mentioned operations from 204 to 208 will be executed to store the transaction identifications and the accurate data values in the standby database eventually.

In the example embodiment of the present disclosure, in the event of a failure of the primary database, with respect to the data values produced after the failure of the primary database, the transaction processing server stores the corresponding data values in the standby database directly.

In the example embodiment of the present disclosure, the determining, by the transaction processing server, the accurate data value corresponding to the transaction identification by using the data value stored in the reading database and the data variation value may include, but is not limited to the following operations:

When the data value corresponding to the transaction identification is not stored in the reading database, the transaction processing server acquires the data value requested by the transaction request in the reading database and determines that the sum or combination of the data value requested by the transaction request in the reading database and the data variation value is the accurate data value corresponding to the transaction identification. Alternatively, when the data value corresponding to the transaction identification has already been stored in the reading database, the transaction processing server determines that the data value corresponding to the transaction identification stored in the reading database is the accurate data value corresponding to the transaction identification.

For example, after the transaction processing server acquires the corresponding transaction identification, which is 123456, and the corresponding data variation value which is to subtract $100, the transaction processing server firstly determines whether the data value corresponding to the transaction identification 123456 is stored in the standby database or not. If the transaction processing has already been performed to the transaction request 1 before 202, and the transaction identification 123456 and data value acquired after the transaction processing are stored in the standby database, there will be a data value corresponding to the transaction identification 123456 stored in the standby database; otherwise, there will be no data value corresponding to the transaction identification 123456 in the standby database.

Secondly, supposing that there is no data value corresponding to the transaction identification 123456 in the standby database, the transaction processing server will determine whether the data value corresponding to the transaction identification 123456 is stored in the reading database or not. When the data value corresponding to the transaction identification 123456 is not stored in the reading database, the transaction processing server acquires the data value requested by the transaction request in the reading database, i.e., the account balance of the user A is $1000, and determines that the sum or combination of the data value ($1000) corresponding to the transaction request in the reading database and the data variation value (−100) is the accurate value corresponding to the transaction identification 123456, i.e., the accurate data value is $900. When the data value corresponding to the transaction identification 123456 has already been stored in the reading database, the transaction processing server determines that the data value (i.e., the account balance of the user A is $900) corresponding to the transaction identification 123456 stored in the reading database is the accurate data value corresponding to the transaction identification 123456, i.e., the accurate data value is $900. Then, the transaction processing server stores the transaction identification 123456 and the accurate data value $900 in the standby database.

In the example embodiment of the present disclosure, after the transaction processing server stores the transaction identification and the accurate data value in the standby database, when the failure of the primary database is recovered, the transaction processing server recovers the data values stored in the standby database to the primary database, and the service is provided based on the data values stored in the primary database.

Overall the techniques of the present disclosure at least have at least the following technical advantages: in the event of a failure of the primary database, the transaction processing server may determine the accurate data value through the data value stored in the reading database and store the accurate data value in the standby database, and thus when there is a failure of the primary database and the primary database waits for a recovery, the service may be provided based on the data value stored in the standby database, so that the transaction processing server may acquire the accurate data value from the standby database to perform a transaction processing, thereby preventing the transaction from being interrupted and improving the user experience.

A second example embodiment of the present disclosure is described below.

Figure 3:
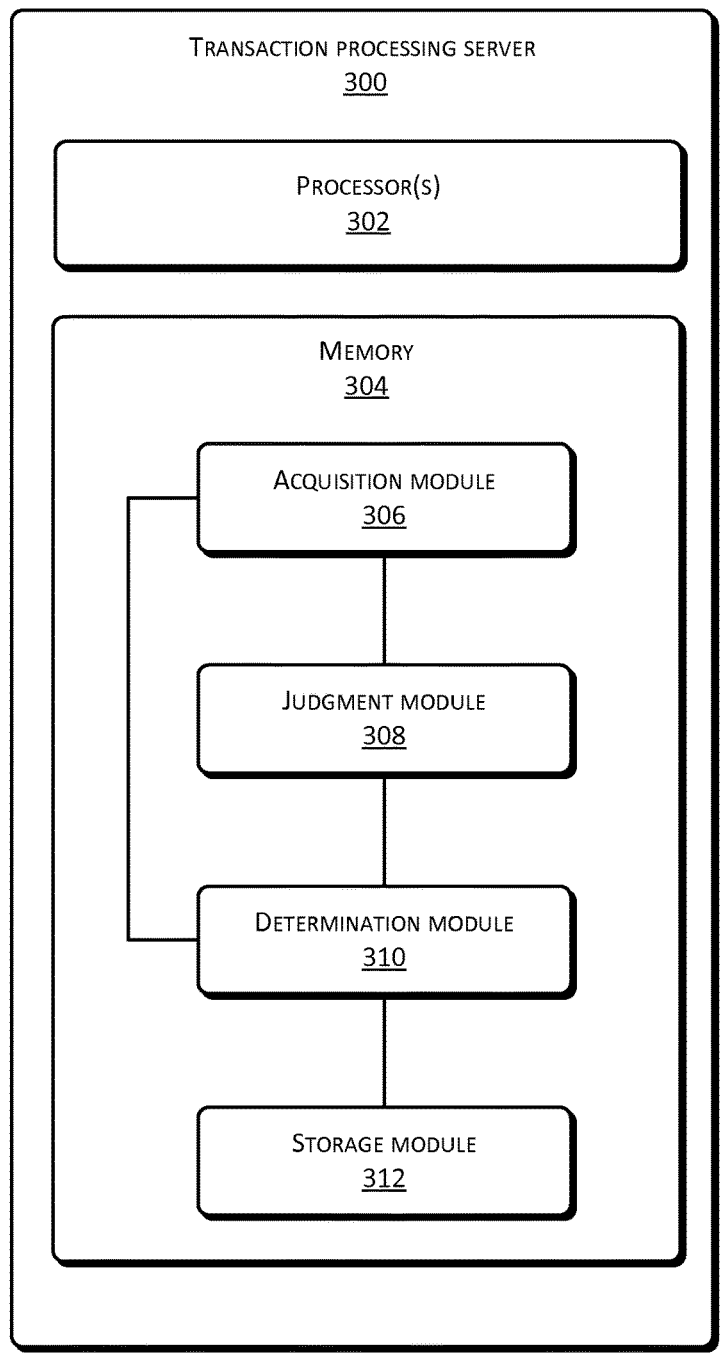
FIG. 3 is a structural schematic diagram of an example transaction processing server according to a second example embodiment of the present disclosure.

Based on the same concept as the above-mentioned method, the present disclosure further provides an example transaction processing server. Data values stored in a primary database is synchronized to a reading database in M seconds. As shown in FIG. 3, a transaction processing server 300 includes one or more processor(s) 302 or data processing unit(s) and memory 304. The transaction processing server 300 may further include one or more input/output apparatuses and network interfaces (not shown in FIG. 3). The memory 304 is an example of computer-readable media.

The computer-readable media includes permanent and non-permanent, movable and non-movable media that may use any methods or techniques to implement information storage. The information may be computer-readable instructions, data structure, software modules, or any data. The example of computer storage media may include, but is not limited to, phase-change memory (PCM), static random access memory (SRAM), dynamic random access memory (DRAM), other type RAM, ROM, electrically erasable programmable read only memory (EEPROM), flash memory, internal memory, CD-ROM, DVD, optical memory, magnetic tape, magnetic disk, any other magnetic storage device, or any other non-communication media that may store information accessible by the computing device. As defined herein, the computer-readable media does not include transitory media such as a modulated data signal and a carrier wave.

The memory 304 may store therein a plurality of modules or units including: an acquisition module 306 that, in the event of a failure of the primary database, determines a transaction request in M seconds and performs a transaction processing of the transaction request to acquire a corresponding transaction identification and a data variation value; a judgment module 308 that determines whether a data value corresponding to the transaction identification is stored in a standby database or not; a determination module 310 that, when the judgment result is negative, determines an accurate data value corresponding to the transaction identification by using the data value stored in the reading database and the data variation value; and a storage module 312 that stores the transaction identification and the accurate data value in the standby database to provide a service based on the data value stored in the standby database.

For example, the acquisition module 306, when determining the transaction request in M seconds, further informs an upstream server to reinitiate the transaction request that is initiated in M seconds s so that the upstream server retransmits the transaction request which has already been initiated in M seconds; receives the transaction request from the upstream server, and determines that the transaction request is the transaction request which is retransmitted by the upstream server and has already been initiated in M seconds.

For example, the judgment module 308, before determining whether the data value corresponding to the transaction identification is stored in the standby database or not, further determines whether the data value corresponding to the transaction identification is stored in the reading database or not; if the data value corresponding to the transaction identification has already been stored, determines that the accurate data value corresponding to the transaction identification has already been stored in the reading database and discards the currently acquired transaction identification and data variation value; and if the data value corresponding to the transaction identification is not stored, executes the process of determining whether the data value corresponding to the transaction identification is stored in the standby database or not.

For example, the judgment module 308, after the determining whether the data value corresponding to the transaction identification is stored in the standby database or not, if the data value corresponding to the transaction identification has already been stored in the standby database, further determines that the accurate data value corresponding to the transaction identification has already been stored in the standby database and discards the currently acquired transaction identification and data variation value.

For example, the determination module 310, when determining the accurate data value corresponding to the transaction identification by using the data value stored in the reading database and the data variation value, if the data value corresponding to the transaction identification is not stored in the reading database, further acquires the data value requested by the transaction request in the reading database and determines that a sum or combination of the data value requested by the transaction request in the reading database and the data variation value is the accurate data value corresponding to the transaction identification; or if the data value corresponding to the transaction identification has already been stored in the reading database, determines that the data value corresponding to the transaction identification stored in the reading database is the accurate data value corresponding to the transaction identification.

For example, the storage module 312, after the storing the transaction identification and the accurate data value in the standby database, when the failure of the primary database is recovered, further recovers the data value stored in the standby database to the primary database and provides the service based on the data value stored in the primary database.

The modules of the device or apparatus of the present disclosure may be either integrated or separately deployed. The above-mentioned modules may be either merged into one module or further divided into a plurality of sub-modules.

By the preceding description of the example embodiments, persons skilled in the art should clearly understand that the present disclosure may be implemented via hardware, software or software plus the necessary general hardware platform. Based on such understanding, the substance of the technical solution of the present disclosure, or the portion of the application that makes contribution to the state of the art, may be embodied in the form of a software product that is stored in computer-readable media and contains computer-executable instructions enabling a computer device (which may be a personal computer, a server, a network device, and so on) to execute the methods or operations recited in the embodiments of the present disclosure. Those skilled in the art may appreciate that the drawings are merely a schematic diagram of example embodiments and it is not necessary to use the modules or flows in the drawings to put the present disclosure into practice. Those skilled in the art may appreciate that the modules in the apparatus in the embodiment may be distributed in the device or apparatus in the embodiment as described or may be modified to be arranged in one or more devices or apparatuses other than those in the present embodiments. The modules in the foregoing embodiment may be combined into one module or further divided into a plurality of sub-modules. The example embodiments of the application have been numbered only for the purpose of description, and not for indication of superiority between the embodiments. The foregoing disclosure is merely illustrative of several examples embodiments of the present disclosure, but the present disclosure is not limited thereto. Any variations which may occur to those skilled in the art shall come into the protection scope of the present disclosure.

What is claimed is:

1. A method comprising:
   determining, by a server, a transaction request has been received within M seconds of a failure of a primary database, M seconds being a number of seconds before the failure of the primary database;
   acquiring a transaction identification and a data variation value corresponding to the transaction request;
   determining whether a data value corresponding to the transaction identification is stored in a standby database;
   determining an accurate data value corresponding to the transaction identification by using a data value requested by the transaction request from a reading database and the data variation value, in response to determining that the data value corresponding to the transaction identification is not stored in the standby database; and
   storing the transaction identification and the accurate data value in the standby database, thereby providing uninterrupted transaction processing in an event of the failure of the primary database.

2. The method of claim 1, further comprising:
   in response to determining that the data value corresponding to the transaction identification is stored in the standby database,
   determining that the accurate data value corresponding to the transaction identification is stored in the standby database; and
   discarding the acquired transaction identification and the data variation value.

3. The method of claim 1, further comprising providing a service based on the accurate data value stored in the standby database.

4. The method of claim 1, wherein:
   the primary database provides a reading service and a writing service when there is no failure of the primary database;

the standby database provides the writing service and the reading service in the event of the failure of the primary database; and the primary database synchronizes data with the reading database within the M seconds.

5. The method of claim 4, wherein when there is no failure of the primary database, the reading database provides a backup function to the primary database and provides the reading service without the writing service.

6. The method of claim 1, wherein the determining the transaction request in M seconds comprises:
informing an upstream server to reinitiate a transaction request that was initiated within the M seconds before the failure of the primary database;
receiving the reinitiated transaction request; and
determining that the reinitiated transaction request is retransmitted by the upstream server and was initiated within the M seconds before the failure of the primary database.

7. The method of claim 1, further comprising:
before determining whether the data value corresponding to the transaction identification is stored in the standby database,
determining that the data value corresponding to the transaction identification is stored in the reading database;
determining that the accurate data value corresponding to the transaction identification has already been stored in the reading database; and
discarding the acquired transaction identification and the data variation value.

8. The method of claim 1, further comprising:
before determining whether the data value corresponding to the transaction identification is stored in the standby database, determining that the data value corresponding to the transaction identification is not stored in the reading database.

9. The method of claim 1, wherein the determining the accurate data value corresponding to the transaction identification by using the data value stored in the reading database and the data variation value comprises:
determining that the data value corresponding to the transaction identification is not stored in the reading database;
acquiring a data value requested by the transaction request from the reading database; and
determining that a sum or combination of the data value requested by the transaction request from the reading database and the data variation value is the accurate data value corresponding to the transaction identification.

10. The method of claim 1, wherein the determining the accurate data value corresponding to the transaction identification by using the data value stored in the reading database and the data variation value comprises:
determining that the data value corresponding to the transaction identification is stored in the reading database; and
determining that the data value corresponding to the transaction identification stored in the reading database is the accurate data value corresponding to the transaction identification.

11. The method of claim 1, further comprising:
after the primary database recovers from the failure,
recovering the accurate data value stored in the standby database to the primary database;
storing the accurate data value;
providing a service based on the accurate data value stored in the primary database.

12. A server comprising:
one or more processors;
a memory communicatively coupled with the one or more processors;
an acquisition module that determines a transaction request has been received within M seconds of a failure of a primary database and acquires a transaction identification and a data variation value corresponding to the transaction request, M seconds being a number of seconds before the failure of the primary database;
a judgment module that determines whether a data value corresponding to the transaction identification is stored in a standby database;
a determination module that determines an accurate data value corresponding to the transaction identification by using a data value stored in a reading database and the data variation value, in response to determining that the data value corresponding to the transaction identification is not stored in the standby database; and
a storage module that stores the transaction identification and the accurate data value in the standby database,
wherein the server provides uninterrupted transaction processing in an event of the failure of the primary database.

13. The server of claim 12, wherein the judgment module further determines that the accurate data value corresponding to the transaction identification is stored in the standby database and discards the acquired transaction identification and data variation value, in response to determining that the data value corresponding to the transaction identification is stored in the standby database.

14. The server of claim 12, wherein:
the primary database provides a reading service and a writing service when there is no failure of the primary database and synchronizes data with the reading database within M seconds;
the standby database provides the writing service and the reading service in the event of the failure of the primary database; and
the reading database provides a backup function to the primary database and provides the reading service without the writing service, when there is no failure of the primary database.

15. The server of claim 12, wherein the acquisition module further:
informs an upstream server to reinitiate the transaction request that was initiated within the M seconds before the failure of the primary database;
receives the reinitiated transaction request; and
determines that the reinitiated transaction request is the transaction request which is retransmitted by the upstream server and was initiated within the M seconds before the failure of the primary database.

16. The server of claim 12, wherein the judgment module further determines that the data value corresponding to the transaction identification is stored in the reading database before determining whether the data value corresponding to the transaction identification is stored in the standby database;
determines that the accurate data value corresponding to the transaction identification has already been stored in the reading database; and
discards the transaction identification and the data variation value.

17. The server of claim 12, wherein the judgment module further determines that the data value corresponding to the transaction identification is not stored in the reading database before determining whether the data value corresponding to the transaction identification is stored in the standby database.

18. The server of claim 12, wherein the determination module further:
- determines that the data value corresponding to the transaction identification is not stored in the reading database;
- acquires a data value requested by the transaction request from the reading database; and
- determines that a sum or combination of the data value requested by the transaction request from the reading database and the data variation value is the accurate data value corresponding to the transaction identification.

19. The server of claim 12, wherein the determination module further:
- determines that the data value corresponding to the transaction identification is stored in the reading database; and
- determines that the data value corresponding to the transaction identification stored in the reading database is the accurate data value corresponding to the transaction identification.

20. One or more non-transitory memories having stored thereon computer-executable instructions executable by one or more processors to perform operations comprising:
- determining a transaction request has been received within M seconds of a failure of a primary database, M seconds being a number of seconds before the failure of the primary database;
- acquiring a transaction identification and a data variation value corresponding to the transaction request;
- determining whether a data value corresponding to the transaction identification is stored in a standby database, the determining including;
- determining an accurate data value corresponding to the transaction identification by using a data value stored in a reading database and the data variation value, in response to determining that the data value corresponding to the transaction identification is not stored in the standby database; or
- determining that the accurate data value corresponding to the transaction identification is stored in the standby database and discarding the acquired transaction identification and data variation value, in response to determining that the data value corresponding to the transaction identification is stored in the standby database; and
- storing the transaction identification and the accurate data value in the standby database, thereby providing uninterrupted transaction processing in an event of the failure of the primary database, wherein:
- the primary database provides a reading service and a writing service when there is no failure of the primary database and synchronizes data with the reading database within M seconds;
- the standby database provides the writing service and the reading service in the event of the failure of the primary database; and
- the reading database provides a backup function to the primary database.

* * * * *